(12) United States Patent
Ito et al.

(10) Patent No.: US 8,066,081 B2
(45) Date of Patent: Nov. 29, 2011

(54) SMALL-SIZED TILLER

(75) Inventors: Tomoki Ito, Wako (JP); Koichi Azuma, Wako (JP); Tomomi Nakaya, Wako (JP); Masayuki Sasaoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 12/622,050

(22) Filed: Nov. 19, 2009

(65) Prior Publication Data

US 2010/0126741 A1    May 27, 2010

(30) Foreign Application Priority Data

Nov. 26, 2008 (JP) ................................. 2008-301383
Nov. 26, 2008 (JP) ................................. 2008-301534

(51) Int. Cl.
*A01B 33/00* (2006.01)
(52) U.S. Cl. .............................. 172/42; 172/41; 172/123
(58) Field of Classification Search .................... 172/42, 172/41, 43, 81, 112, 118, 123, 508, 776
See application file for complete search history.

(56) References Cited

U.S. PATENT DOCUMENTS

| 2,661,584 | A | * | 12/1953 | Ronning | ........................ | 56/501 |
| 2,750,859 | A | * | 6/1956 | Smithburn | ..................... | 172/42 |
| 2,827,842 | A | * | 3/1958 | Peterson et al. | ................ | 172/42 |
| 3,888,196 | A | * | 6/1975 | Glenn | ........................... | 111/131 |
| 6,968,906 | B2 | * | 11/2005 | Ito et al. | ........................... | 172/41 |
| 7,584,804 | B2 | * | 9/2009 | Fukuzumi et al. | ............. | 172/42 |

FOREIGN PATENT DOCUMENTS

| EP | 2 033 505 A1 | 3/2009 |
| JP | 62-18163 Y2 | 5/1987 |
| JP | 63-167804 U | 11/1988 |
| JP | 2006-115777 A | 5/2006 |

* cited by examiner

*Primary Examiner* — Thomas Will
*Assistant Examiner* — Jamie L McGowan
(74) *Attorney, Agent, or Firm* — Arent Fox LLP

(57) ABSTRACT

A small-sized tiller includes a stand unit configured to solely support the tiller in a self-standing state. The stand unit has a pole portion removably mountable to a resistance-bar attachment portion of the body frame when a resistance bar has been removed from the resistance-bar attachment portion.

6 Claims, 14 Drawing Sheets

SMALL-SIZED TILLER

CROSS-REFERENCE TO RELATED APPLICATION

This application claims the priority of Japanese Application Nos. P2008-301383, filed Nov. 26, 2008 and P2008-301534, filed Nov. 26, 2008 the entire specifications, claims and drawings of which are incorporated herewith by reference.

FIELD OF THE INVENTION

The present invention relates to a small-sized tiller having a resistance bar removably mounted in an attachment hole in the body frame for insertion into the ground to stabilize the posture of the tiller during tilling operation.

BACKGROUND OF THE INVENTION

Various small-sized tillers of the type concerned are known and used heretofore. According to one example of such known small-sized tillers, which is disclosed in Japanese Patent Laid-open Publication (JP-A) No. 2006-115777, a kickstand provided at a front portion of the body frame flips down from the body frame and makes contact with the ground to allow the tiller to be kept upright in a condition in which the kickstand, tilling tines of a tilling unit, and a resistance bar are in contact with the ground. In the disclosed tiller, the stand, tilling unit and resistance bar together form a stand unit.

However, since the kickstand requires a separate bracket for attachment to the body frame, the tiller having such kickstand becomes relatively complicated in construction and costly to manufacture. Furthermore, since the tilling unit itself forms a part of the stand unit, the tiller is practically impossible to keep its upright position without the tilling unit. Accordingly, the known tiller requires a tilling unit (working tool) replacement work which is tedious and time consuming. The same problem may also occur when the tilling unit is temporarily removed for wishing or maintenance.

It is accordingly an object of the present invention to provide a small-sized tiller which is capable of keeping a self-standing state (or an upright position) with a relatively simple and inexpensive structure and allows for replacement, cleaning and maintenance of a tilling unit with ease and high efficiencies.

SUMMARY OF THE INVENTION

According to the present invention, there is provided a small-sized tiller comprising: a body frame having a resistance-bar attachment hole formed therein; a resistance bar removably mounted to the resistance-bar attachment hole for insertion into soil to stabilize the posture of the tiller during tilling operation; and a stand unit configured to solely support the tiller in a self-standing state, said stand unit having a pole portion removably mountable to the resistance-bar attachment hole when the resistance bar has been removed from the resistance-bar attachment hole.

With this arrangement, since the stand unit can be attached to the body frame of the tiller by using the resistance-bar attachment hole that is initially provided for attachment of the resistance bar to the tiller body frame, the stand does not require a separate bracket for attachment to the tiller body frame and hence the tiller is relatively simple in construction and can be manufactured less costly. Furthermore, since the stand unit is configured to solely support the tiller in an upstanding state (or in an upright position), the replacement, cleaning and maintenance of a tilling unit of the tiller can be achieved easily and efficiently.

Preferably, the stand unit includes a wheel for allowing the tiller to be transferred. By virtue of the wheel, the tiller 10 is highly easy-to-use and has an improved mobility.

In one preferred form of the invention, the small-sized tiller further includes a tilling unit rotatably mounted to a lower portion of the body frame for cultivating soil, and the stand unit has a self-standing structure and includes at least one horizontal foot disposed below the tilling unit with a space defined between a lower end portion of the tilling unit and the foot of the stand unit. With this arrangement, since the tilling unit is suspended in the air, the replacement, cleaning and maintenance of the tilling unit can be achieved easily and efficiently. The stand unit may further include a wheel for allowing the tiller to be transferred. In this instance, the wheel is preferably disposed rearwardly of the foot and serves also as a second foot when the tiller is kept in the self-standing state by the stand unit.

Preferably, the stand unit has a tubular holder for releasably holding therein the resistance bar. By thus providing the tubular holder, it is possible to preclude retain the resistance bar on the stand unit without loss or missing.

The small-sized tiller may further comprise a box-like carrier case which is removably attached to the stand unit for covering the tilling unit from below. By thus covering the tilling unit with the carrier case, soil which may drop from the tilling unit during storage or transportation of the tiller is held within the carrier case without falling on the floor of a storage site or of a vehicle. The storage site floor or the vehicle floor can be kept clean without being soiled or dirtied with the soil which has dropped from the tilling unit.

Preferably, the stand unit has at least one support leg extending in a vertical downward direction of the body frame and terminating in a horizontal foot disposed below the tilling unit with a space defined between a lower end portion of the tilling unit and the horizontal foot of the stand unit, and the carrier case has a recessed engagement groove formed in an outer surface of the carrier case and fixedly engageable with the support leg of the stand unit to support the carrier case on the stand unit.

In one preferred form of the invention, the boxed-like carrier case has a generally rectangular bottom wall, a front wall extending upwardly from a front edge of the rectangular bottom wall, a rear wall extending upwardly from a rear edge of the rectangular bottom wall, a left sidewall extending upwardly from a left side edge of the rectangular bottom wall, and a right sidewall extending upwardly from a right side edge of the rectangular bottom wall. The recessed engagement groove is formed in the bottom wall and at least one of the front and rear walls and extends continuously from an upper edge of said one wall toward the other of the front and rear walls, the recessed engagement groove terminating short of the other wall. The carrier case is attached to the stand unit by forcing the carrier case to advance along the support leg in a direction from a front end toward an upper end of the support leg, with the upper edge of said one wall directed forward as a leading end of the carrier case, while the recessed engagement groove is held in guided engagement with the support leg. During advancing movement of the carrier case, the carrier case is caused to turn about the axis of a tilling shaft through an angle of about 90 degrees.

Preferably, the box-like carrier case has a grip portion of an enlarged width projecting from an upper edge of each sidewall of the box-like carrier case in a lateral outward direction of the carrier case. The body frame further has a carry handle for being gripped by a human operator standing on a side of one of the lateral sidewalls when the tiller is to be hand-carried by the human operator. The grip portion is provided on only an end portion of the upper edge of each sidewall so as not to interfere with the human operator during hand-carrying of the tiller by the human operator.

The box-like carrier case may further have at least one drain hole formed in a front wall or a rear wall of the box-like carrier case for drawing off water from the carrier case. The drain hole is preferably located at a position vertically and upwardly separated from a bottom wall of the carrier case by a predetermined distance. Since the drain hole is located at a higher level than that of the bottom wall of the carrier case, the carrier case can retain a predetermined amount of water that may drop from the tilling unit after washing of the tilling unit. This is particularly advantageous when the tiller is stored in a storage site or transported by a vehicle because thea storage site or the vehicle is prevented from becoming flooded with water. The drain hole can readily assume a lowermost position of the carrier case when the tiller is tilted downward in a forward or a backward direction about an axis of the wheel. In this instance, water retained within the carrier case is drawn off from the drain hole.

BRIEF DESCRIPTION OF THE DRAWINGS

A preferred structural embodiment of the present invention will be described in detail below, by way of example only, with reference to the accompanying sheets of drawings, in which.

DETAILED DESCRIPTION OF THE PREFERRED EMBODIMENT

Figure 1:
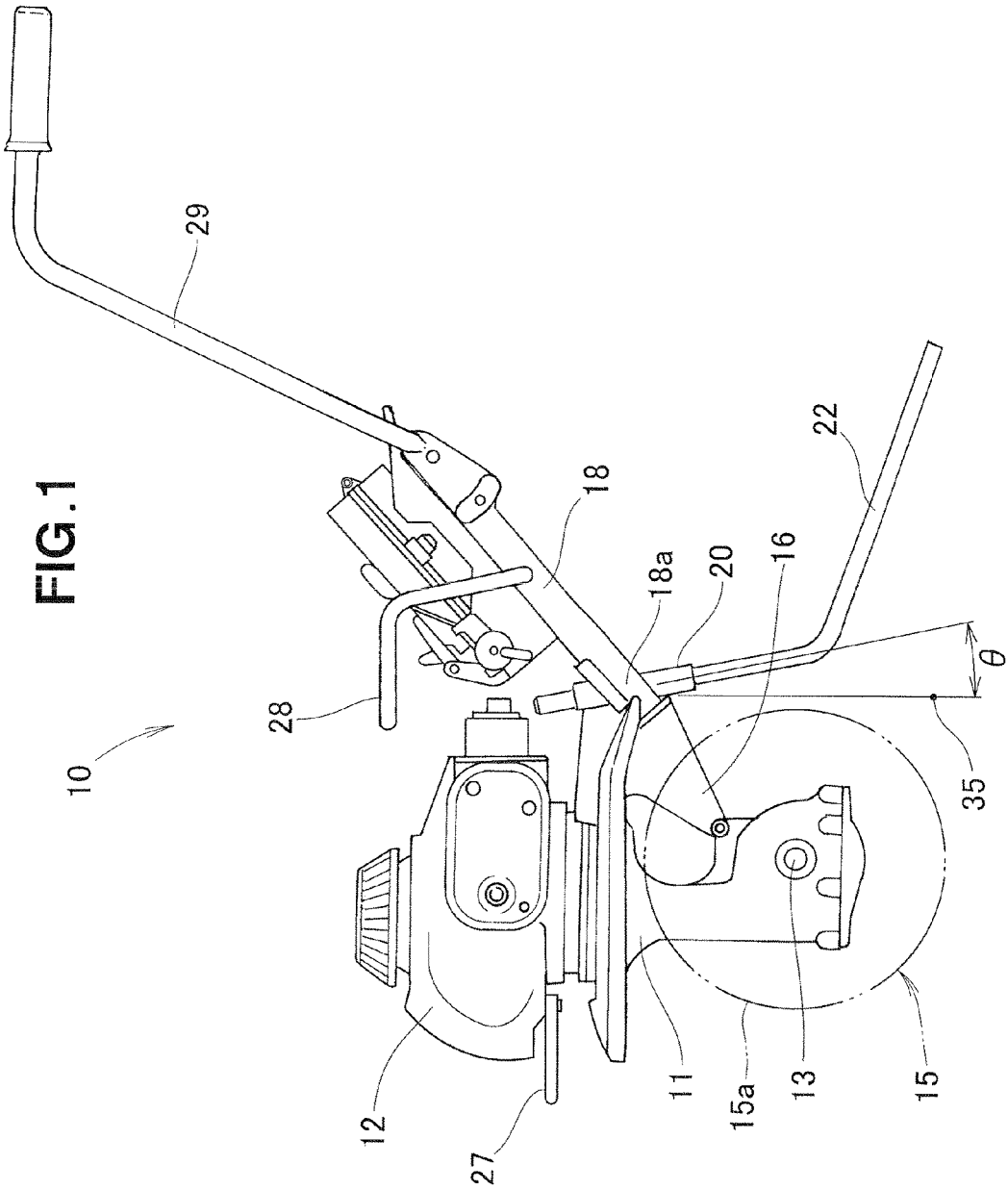
FIG. 1 is a left side view of a small-sized tiller having a resistance bar according to a preferred embodiment of the present invention.

Referring now to the drawings and FIG. 1 in particular, there is shown a small-sized tiller 10 according to one preferred embodiment of the present invention. The tiller 10 takes the form of a walk-behind tiller and generally comprises a body frame 11, an engine 12 mounted on an upper end of the body frame 11, a horizontal tilling shaft 13 rotatably mounted on a lower portion of the body frame 11, a tilling unit (cultivating tool) 15 removably mounted to the tilling shaft 13 for rotation with the shaft 13 and having a plurality of tilling tines 15a (FIG. 11), a handle column 18 mounted via a bracket 16 to a rear part of the body frame 11 and extending obliquely upward in a rearward direction of the body frame 11, a resistance-bar attachment portion 20 connected to a front end portion of the handle column 18, a resistance bar 22 removably mounted to the resistance-bar attachment portion 20, a carry handle 28 provided on an intermediate portion of the handle column 18, and an operation handle 29 provided on an upper end of the handle column 18.

With the tiller 10 thus arranged, power from the engine 12 is transmitted to the tilling shaft 13 and rotates the latter so that the tiller 10 can travel forward by itself while cultivating soil by the tilling unit 15 rotatably driven by the engine 12.

According to the embodiment of the present invention, the tiller 10 also includes a stand unit 24 (FIG. 2) which is removably mountable to the resistance-bar attachment portion 20 when the resistance bar 22 has been removed from the resistance-bar attachment portion 20, and a carrier case 26 (FIG. 3) which is removably mountable to the stand unit 24.

Figure 4:
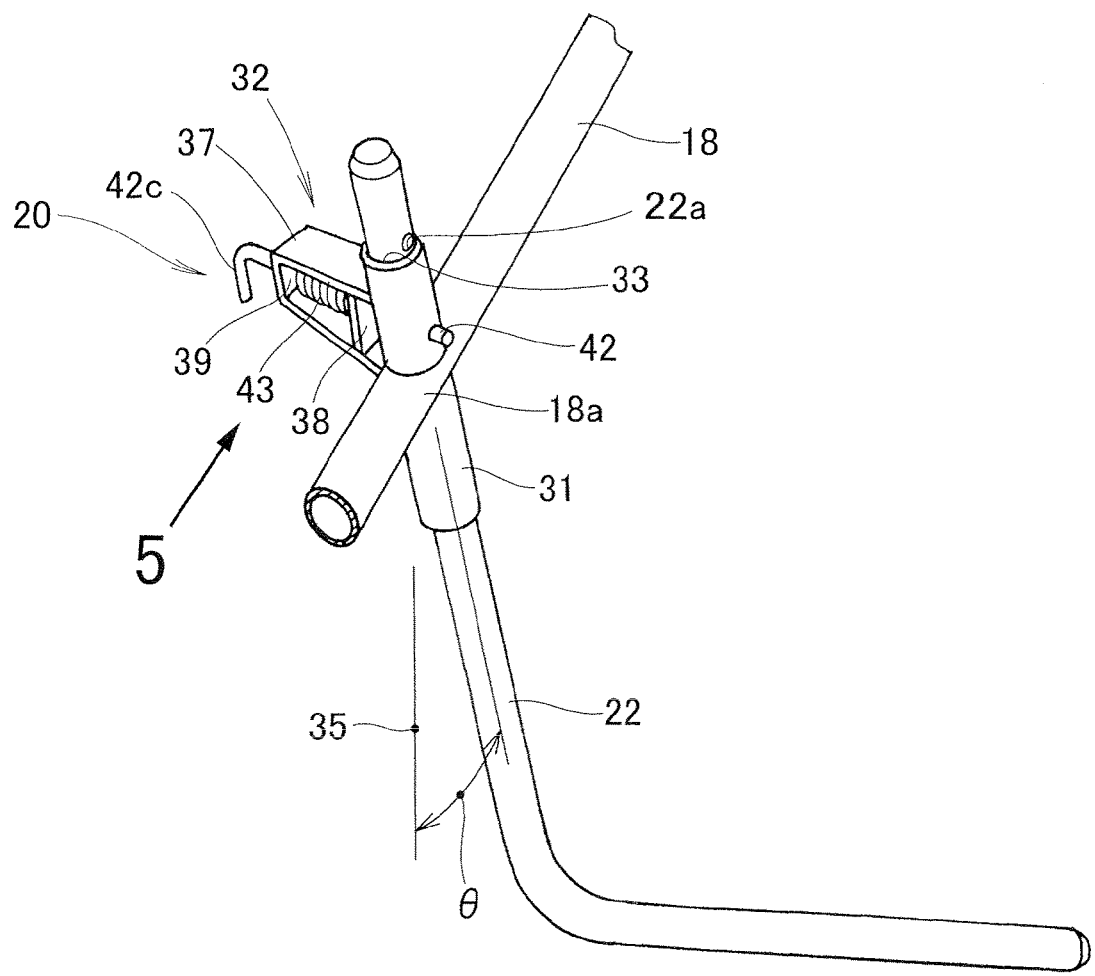
FIG. 4 is a perspective view of the resistance bar as being attached to the tiller.
Figure 5:
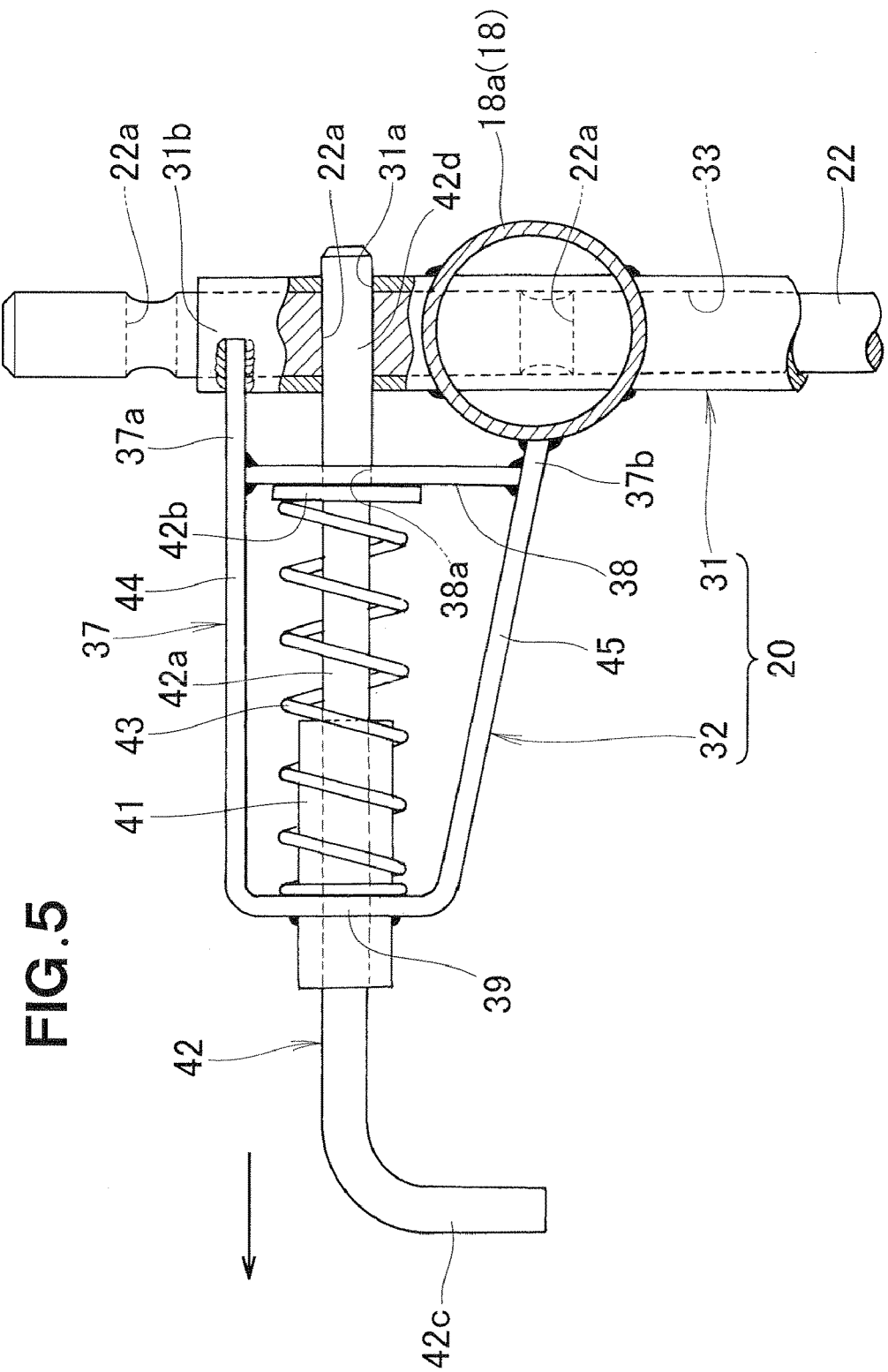
FIG. 5 is an enlarged view, with parts broken away for clarity, looking in the direction of an arrow 5 of FIG. 4.

As shown in FIGS. 4 and 5, the resistance-bar attachment portion 20 includes an attachment pipe 31 connected to a front end portion 18a of the handle column 18, and an adjuster pin assembly 32 mounted to the attachment pipe 31.

The attachment pipe 31 is a tubular member having an axial through-hole forming a resistance-bar attachment hole 33 (FIG. 5). The attachment pipe 31 extends diametrically across the front end portion 18a of the handle column 18 and inclines at an angle θ to a vertical line so that the attachment pipe 31 slopes downward in a rearward direction of the body frame 11 (FIG. 1). As shown in FIG. 5, the attachment pipe 31 has a locking hole 31a extending across the diameter of the attachment pipe 31. The locking hole 31 is disposed above the front end portion 18a of the handle column 18.

The adjuster pin assembly 32 includes a bracket 37 of a horizontally U-shaped configuration having opposite end portions (upper and lower end portions) 37a and 37b connected by welding to an upper end portion 31b of the attachment pipe 31 and the front end portion 18a of the handle column 18, respectively, a rectangular plate stopper 38 connected by welding to the upper and lower end portions 37a, 37b of the U-shaped bracket 37, a cylindrical collar 41 extending through a bent portion 39 of the U-shaped bracket 37 and disposed coaxially with the locking hole 31a of the attachment pipe 31, an adjuster pin 42 mounted to extend through the collar 41 and insertable through the locking hole 31a of the attachment pipe 31, and a compression coil spring 43 disposed between the stopper 38 and the bent portion 38 of the U-shaped bracket 37.

The U-shaped bracket 37 has a pair of opposed legs (upper and lower legs) 44 and 45. The end portion 37a of the upper leg 44 is welded to the upper end portion 31b of the attachment pipe 31, while the end portion 37b of the lower leg 45 is welded to the upper end portion 18a of the handle column 18. The upper and lower legs 44 and 45 of the U-shaped bracket 37 are integrally connected together by the bent portion 39.

The rectangular plate stopper 38 has opposite ends connected to the end portions 37a, 37b of the upper and lower legs 44, 45, and a through-hole 38a formed in a substantially central portion thereof. The through-hole 38a is coaxial with the cylindrical collar 41 and the locking hole 31a of the attachment pipe 31. The collar 41 extends through the bent portion 39 of the U-shaped bracket 37 and is connected by welding to the bent portion 39.

The adjuster pin 42 has a straight or rectilinear pin body 42a extending through the collar 41 and the through-hole 38a of the stopper 38 and inserted through the locking hole 31a of the attachment pipe 31, an annular flange 42b formed on an intermediate portion of the pin body 42a extending between the stopper 38 and the bent portion 39 of the U-shaped bracket 37, and a handgrip 42c formed at an end portion of the pin body 42a projecting from the collar 41 in a direction away from the attachment pipe 31.

The compression coil spring 43 is disposed around the collar 41 and acts between the bent portion 39 of the U-shaped bracket 37 and the annular flange 42b of the adjuster pin 42.

Figure 2:
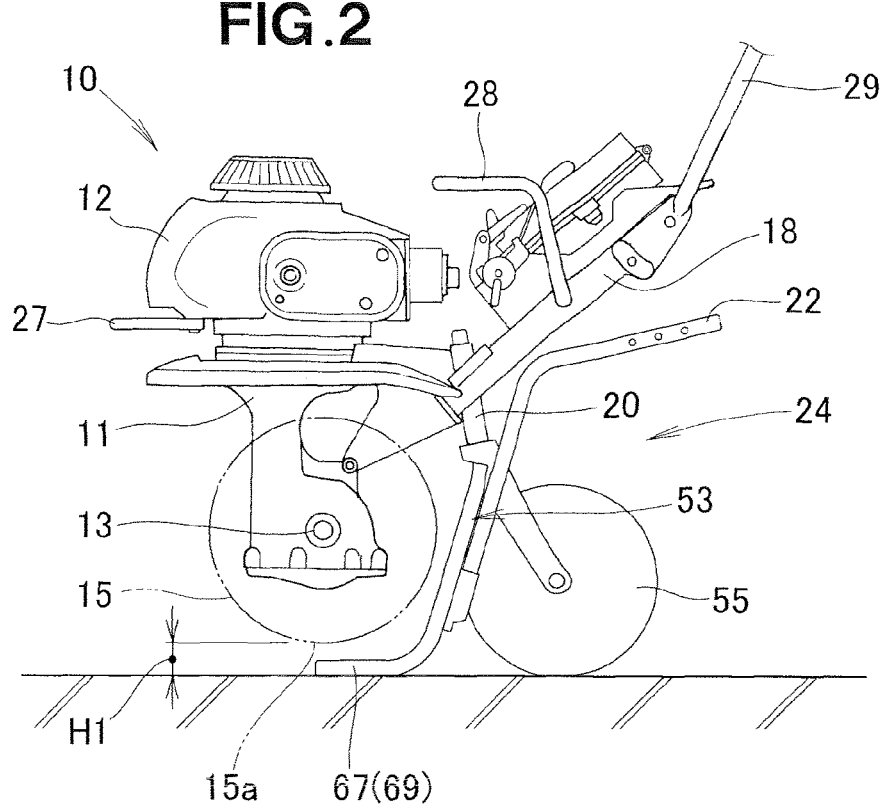
FIG. 2 is a view similar to FIG. 1, but showing the small-sized tiller having a stand unit attached to a body of the tiller in place of the resistance bar.
Figure 3:
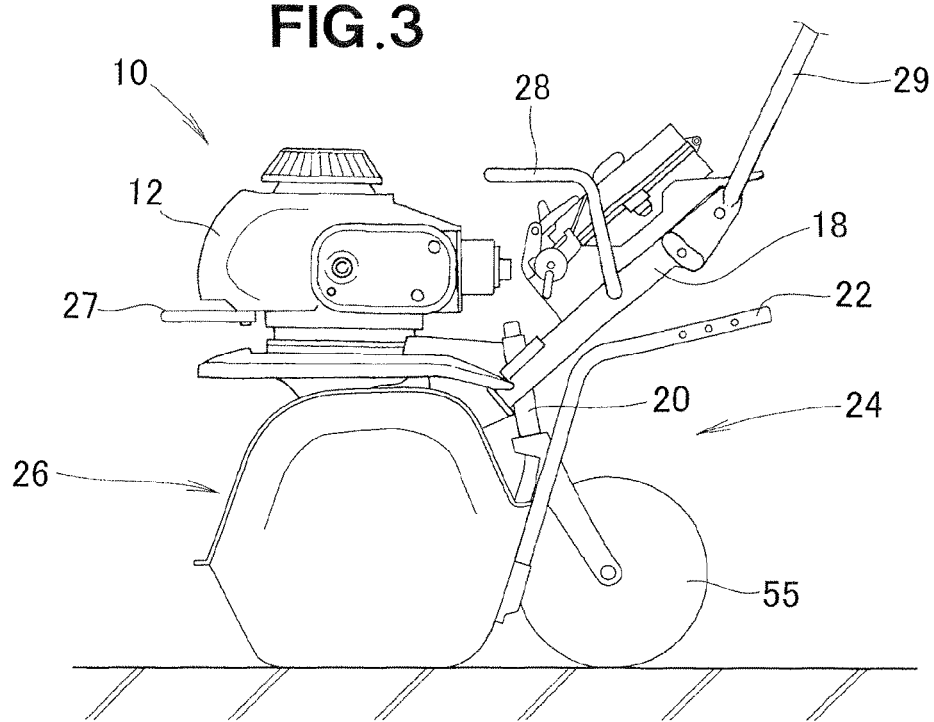
FIG. 3 is a view similar to FIG. 2, but showing the small-sized tiller having a carrier case attached to the stand unit so as to cover a tilling unit from below.

With the adjuster pin assembly 32 thus arranged, the adjuster pin 42 is normally disposed in a locking position shown in FIG. 2, in which by a force or resiliency of the compression coil spring 43, the annular flange 42b of the adjuster pin 42 is urged into abutment with the stopper 38 so that a front end portion 42d of the adjuster pin 42 is inserted through the locking hole 31a of the attachment pipe 31 and one of attachment holes 22a of the resistance bar 22 which is received in the resistance-bar attachment hole 31 of the attachment pipe 33. The attachment holes 22a extend diametrically across the resistance bar 22 and are formed in an upper end portion of the resistance bar 22 at regular intervals in a longitudinal direction of the resistance bar 22 so that the depth of insertion of the resistance bar 22 into soil being cultivated can be adjusted. The resistance bar 22 thus attached to the attachment pipe 31 is able to produce a resistance force against the forward dashing movement of the tiller 10 to thereby stabilize the posture of the tiller 10 during the tilling operation of the tiller 10.

The adjuster pin 42 can be moved from the locking position of FIG. 5 to a releasing position (not shown) by pulling the handgrip 42c in the direction of an arrow shown in FIG. 5 against the force of the compression coil spring 43 until the front end portion 42d of the adjuster pin 42 is removed from at least the attachment hole 22a of the resistance bar 22. It will be appreciated that the resistance bar 22 can be easily and quickly attached to and detached from the resistance-bar attachment hole 33 of the attachment pipe 31.

Figure 6:
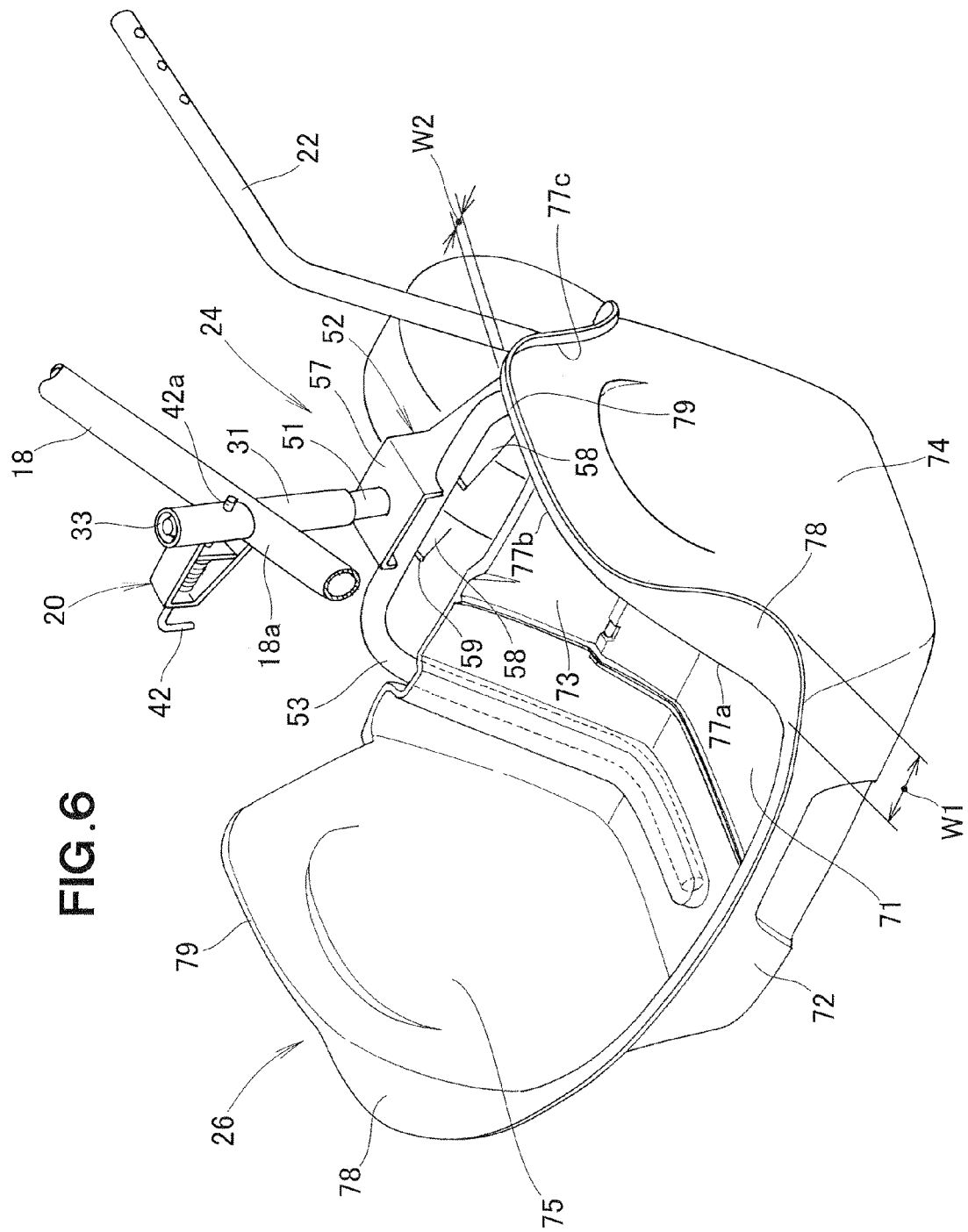
FIG. 6 is a perspective view showing the stand unit and the carrier case assembled together with the stand unit attached to the body frame.
Figure 7:
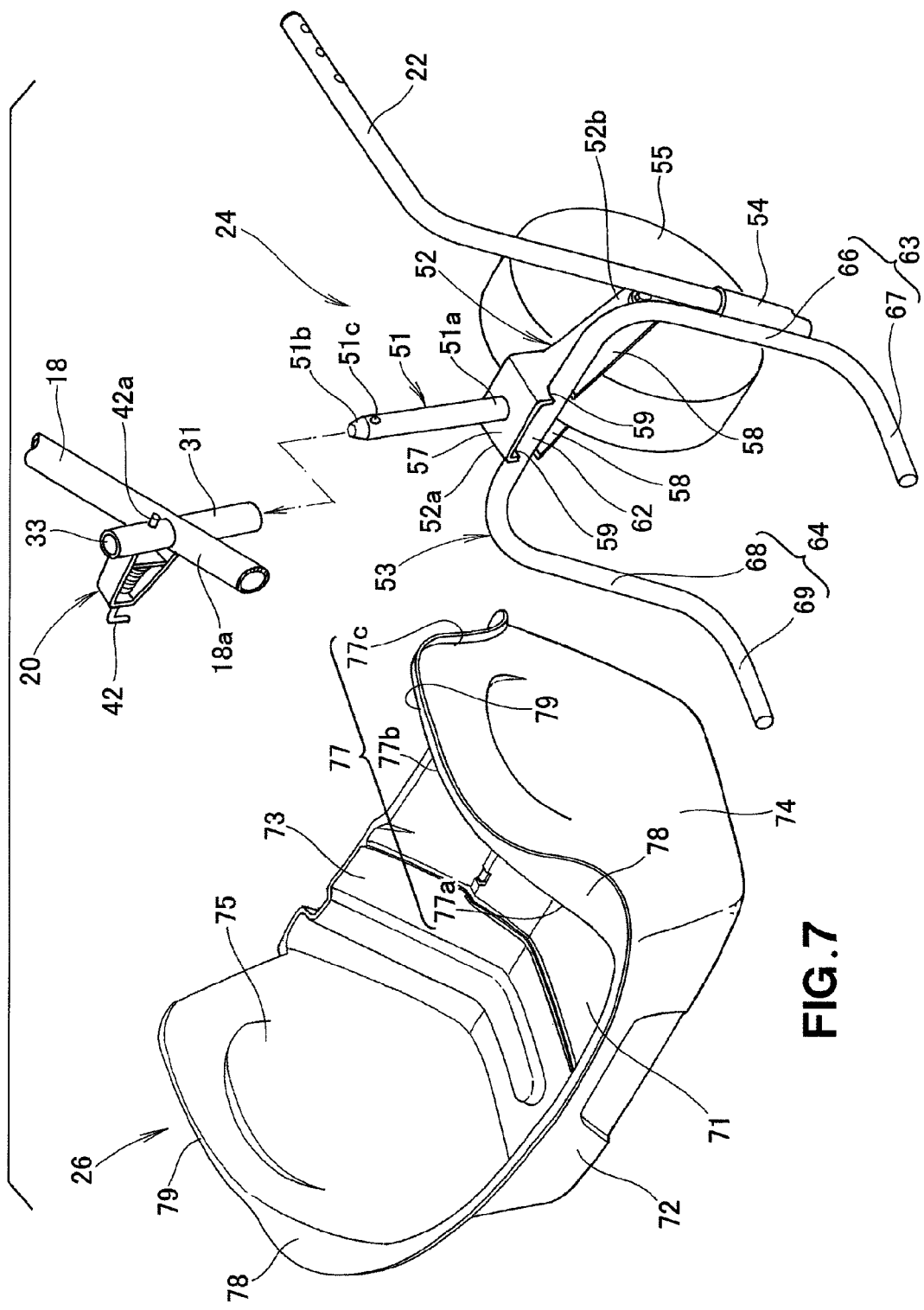
FIG. 7 is an exploded perspective view showing the stand unit and the carrier case disassembled from each other with the stand unit removed from the body frame.

Referring next to FIG. 6, there is shown in perspective the stand unit 24 as it is attached to the attachment pipe 31 of the tiller 10 (FIG. 2) with the carrier case 26 mounted to the stand unit 24. FIG. 7 is an exploded perspective view of FIG. 6. As shown in FIG. 7, the stand unit 24 has a pole portion 51 removably mountable to the resistance-bar attachment hole 33 of the attachment pipe 31, a mount bracket 52 connected to a lower end 51a of the pole portion 51, a stand member 53 connected to an upper end portion 52a of the mount bracket 52, a resistance-bar holder 54 mounted to a portion of the stand member 53, and a single wheel 55 rotatably mounted on a lower end portion 52b of the mount bracket 52.

The pole portion 51 is formed by a round bar having an outside diameter slidably receivable in the resistance-bar attachment hole 33 of the attachment pipe 31 from below. The pole portion 41 has an attachment hole 51c extending diametrically across an upper end portion 51b of the pole portion 41. The attachment hole 51c has an inside diameter which is slidably receptive of the front end portion 42d (FIG. 5) of the adjuster pin 42. When the adjuster pin 42 comes into in interlocking engagement with the pole portion 51 of the stand unit 24 while the pole portion 51 is received in the resistance-bar attachment hole 33 of the attachment pipe 31, the stand unit 24 is attached to the attachment pipe 31 of the tiller 10.

Since the stand unit 24 can be removably attached to tiller 10 by using the resistance-bar attachment hole 33 of the attachment pipe 31, the tiller 10 is allowed to have no separate part or member, such as an attachment bracket, which should otherwise be provided exclusively for the attachment of the stand unit 24. Thus, the tiller 10 is relatively simple in construction and can be manufactured less costly.

The mount bracket 52 has a generally inverted U-shaped configuration including a substantially rectangular head portion 57 and pair of opposed (left and right) legs 58, 58 extending downwardly from lateral opposite sides (left and right sides) of the head portion 57. The legs 58 have retaining recesses 59 formed in upper end portions thereof, and an upper horizontal portion 62 of the stand member 53 is fixedly received in the retaining recesses 59. The wheel 55 is disposed between the legs 58 and rotatably mounted to lower ends of the legs 58 via a support shaft (not designated).

Figure 8:
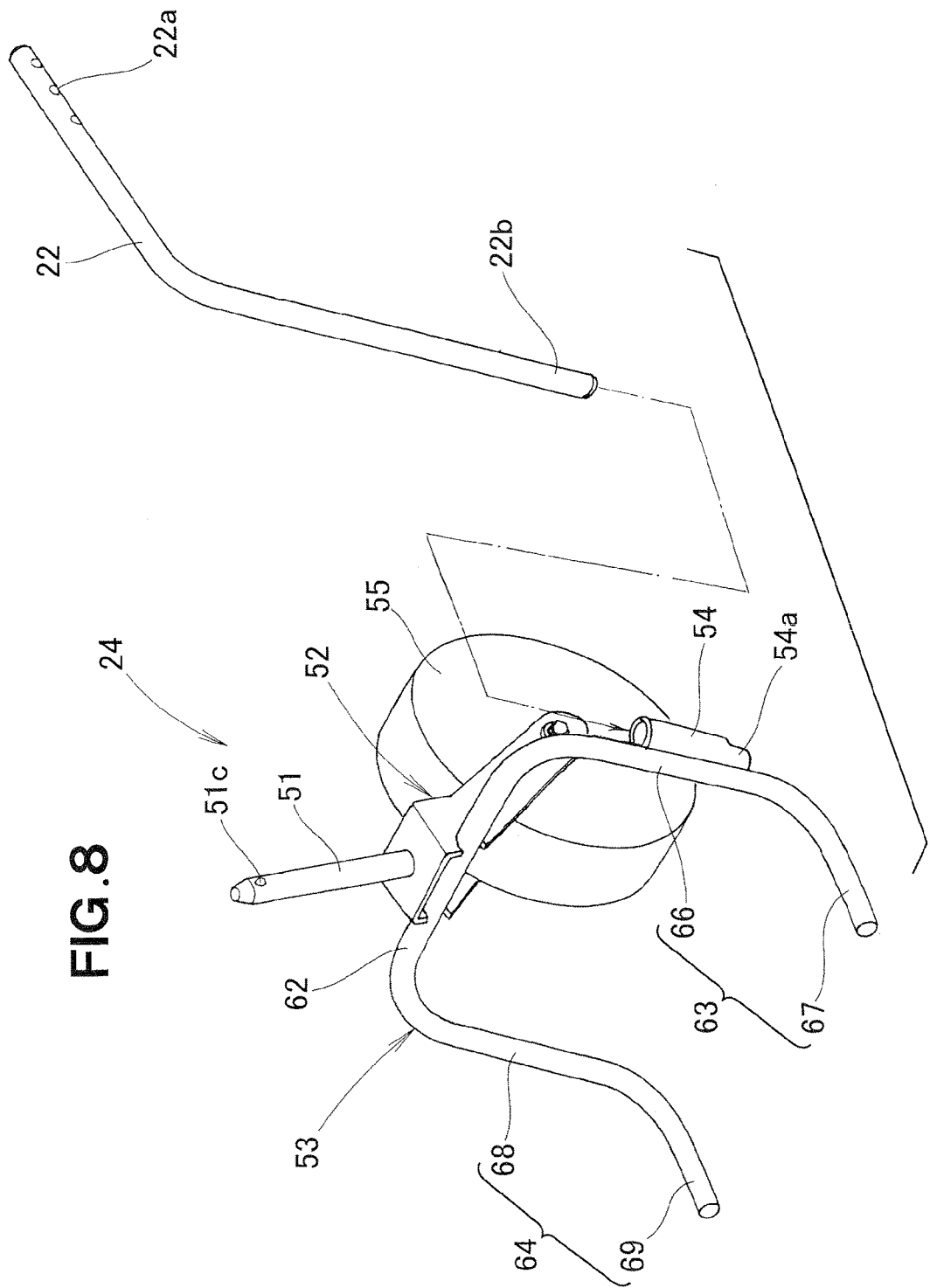
FIG. 8 is a perspective view of the stand unit before the resistance bar is held on a part of the stand unit.

As shown in FIG. 8, the stand member 53 is formed from a single round rod bent into a generally U-shaped configuration. The U-shaped stand member 53 has the upper horizontal portion 62, a left support leg 63 extending contiguously from a left end of the upper horizontal portion 62 in a downward and forward direction, and a right support leg 64 extending continuously from a right end of the upper horizontal portion 62 in a downward and forward direction. The left and right support legs 63 and 64 extend parallel to each other.

The left support leg 63 includes a left leg proper or body 66 extending obliquely downward from the left end of the upper horizontal portion 62, and a left horizontal hoot 67 extending from a lower end of the left leg body 66 in a forward direction. Similarly, the right support leg 64 includes a right leg proper or body 68 extending obliquely downward from the right end of the upper horizontal portion 62, and a right horizontal foot 69 extending from a lower end of the right leg body 68 in a forward direction.

The stand unit 24 of the foregoing arrangement has a self-standing structure that is capable of standing on the ground by itself. More particularly, the stand unit 24 is configured such that when stand unit 24 is mounted to the resistance bar attachment portion 20 of the tiller 10 as shown in FIG. 2, the left and right horizontal feet 67, 69 are disposed directly below the tilling unit 15 with a space H1 defined between the feet 67, 69 and a lower end portion 15a of the tilling unit 15. With this configuration, the stand unit 24 is able to solely support the tiller 10 in a self-standing state (or in an upright position) while the left and right horizontal feet 67, 69 and the wheel 55 are in contact with the ground surface with the tilling unit 15 vertically upwardly separated from the ground surface by a distance of the space H1.

The resistance bar holder 54 is formed from a tubular member, such as a pipe, connected, for example, by welding to the left leg proper 66 of the stand member 53 so as to extend along the left leg proper 66. The tubular holder 54 has a lower end portion 54a constricted or squeezed in a radial inward direction so that the resistance bar 22 can be held on the stand unit 24 with its lower end portion removably received in the holder 54.

It will be understood from the foregoing discussion that the stand unit 24 has a self-standing structure that is capable of standing on the ground without external aid. More particularly, the stand unit 24 is able to stand on a ground surface by itself while making contact with the ground surface at three points that are formed by the left and right horizontal feet 67, 69 and the wheel 55 of the stand unit 24. In this instance, the wheel 55 serves as an additional foot. The stand unit 24 can be easily attached to the body frame 11 by merely mounting the pole portion 51 of the stand unit 24 in the resistance-bar attachment hole 33 in place of the resistance bar 22. The stand unit 24 is able to solely support the tiller 10 in a self-standing state while the feet 67, 69 and the wheel 55 of the stand unit 24 are in contact with the ground surface, as shown in FIG. 2. By thus providing the stand unit 24, the tiller 10 is allowed to be kept in the upright position, which is particularly suitable for transportation and storage of the tiller 10.

In the illustrated embodiment, when the tiller 10 is supported in the self-standing state by the stand unit 24, the feet 67, 69 of the stand unit 24 are disposed directly below the tilling unit 15 of the tiller 10 and spaced vertically downward from the lower end 15a of the tilling unit 15 by a distance H (FIG. 2). This means that the tilling 15 is suspended in the air when the tiller 10 is in the self-standing state. By thus keeping the tilling 15 in the suspended condition in the air, the replacement, cleaning and maintenance of the tilling 15 can be achieved easily and efficiently.

Furthermore, the wheel 55 provided on the stand unit 24 allows the tiller 10 to be readily transferred to a desired place. Thus, the tiller 10 is highly easy-to-use and has an improved mobility. Additionally, since the wheel 55 serves also as a third or rear foot of the stand unit 24 while the tiller 10 is in the self-standing state, the stand unit 24 as a whole is relatively simple in structure and can be manufactured at a relatively low cost.

Referring back to FIGS. 6 and 7, the carrier case 26 is mounted to the stand member 53 (and more particularly to the left and right legs 63, 64) of the stand unit 24 for covering the tilling unit 15 (FIG. 1) from below. By thus covering the tilling unit 15 with the carrier case 26, soil which may drop from the tilling unit 15 during storage or transportation of the tiller 10 is held within the carrier case 26 without falling on the floor of a storage site or of a vehicle. The storage site floor or the vehicle floor can be kept clean without being soiled or dirtied with the soil which has dropped from the tilling unit 15.

The carrier case 26 has a generally rectangular box-like configuration and includes a rectangular bottom wall 71, a front wall 72 extending upwardly from a front edge of the bottom wall 71, a rear wall 73 extending upwardly from a rear side edge of the bottom wall 71, a left sidewall 74 extending upwardly from a left side edge of the bottom wall 71, and a right sidewall 75 extending upwardly from a right side edge of the bottom wall 71.

The bottom wall 71 extends in a horizontal plane. The front wall 72 is slanted forward, and the rear wall 73 is slanted backward. The left and right sidewalls 74 and 75 extend substantially parallel to a vertical plane. The left sidewall 74 has an upper edge 77 (FIG. 7) including a front upper edge portion 77a sloping downward in a forward direction, a central upper edge portion 77b extending in a horizontal plane, and a rear upper edge portion 77c sloping downward in a backward direction. The left sidewall 74 further has a grip portion 78 of an enlarged width W1 (FIG. 6) projecting from the front upper edge portion 77a in a lateral outward direction of the carrier case 26, and a flange portion 79 of a uniform width W2 (FIG. 6) projecting from the central and rear upper edge portions 77b and 77c in the lateral outward direction of the carrier case 26. The width W1 of the grip portion 78 is made considerably larger than the width W2 of the flange portion 79 so that the user can grip the grip portion with improved reliability.

The right sidewall 75 is symmetrical with the left sidewall 74 and a further description thereof can be omitted. However, for easy reference, the same reference characters as those used in conjunction with the left sidewall 74 are also used to designate corresponding parts of the right sidewall 75.

Figure 9:
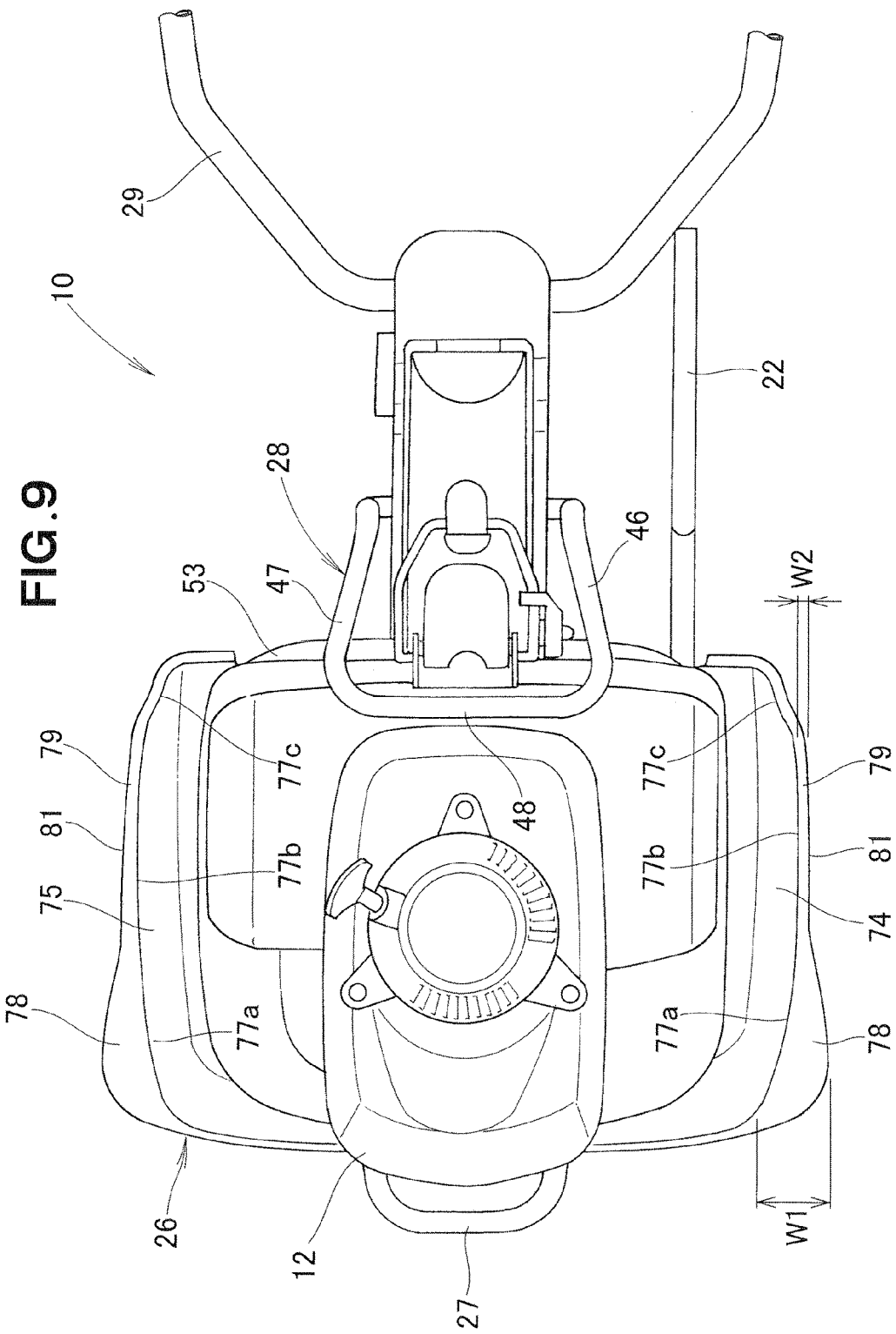
FIG. 9 is an enlarged top plan view of FIG. 3.

As shown in FIG. 9, each of the grip portions 78 projects in a lateral outward direction to a greater extent as compared to the corresponding flange portion 79, so that a recessed portion 81 is formed behind the grip portion 78 on each lateral side of the carrier case 26. By virtue of the grip portions 78 provided on the front upper edge portions 77a of the left and right sidewalls 74, 75, the user or human operator can easily lift up the carrier case 26 while gripping the grip portions 78 with its hands. The recessed portions 81 serve to prevent interference between the user and the carrier case 26 when the user lifts up the tiller 10 for transportation thereof, as will be described later. The recessed portion 81 are formed as a result of the grip portions 78 which are provided on only the front end portions 77a of the upper edges 77 of the left and right sidewalls 74, 75 so as not to interfere with a human operator who is attempting to lift up and transfer the tiller while standing on a side of one or both sidewalls 74, 75 of the carrier case 26.

Figure 10:
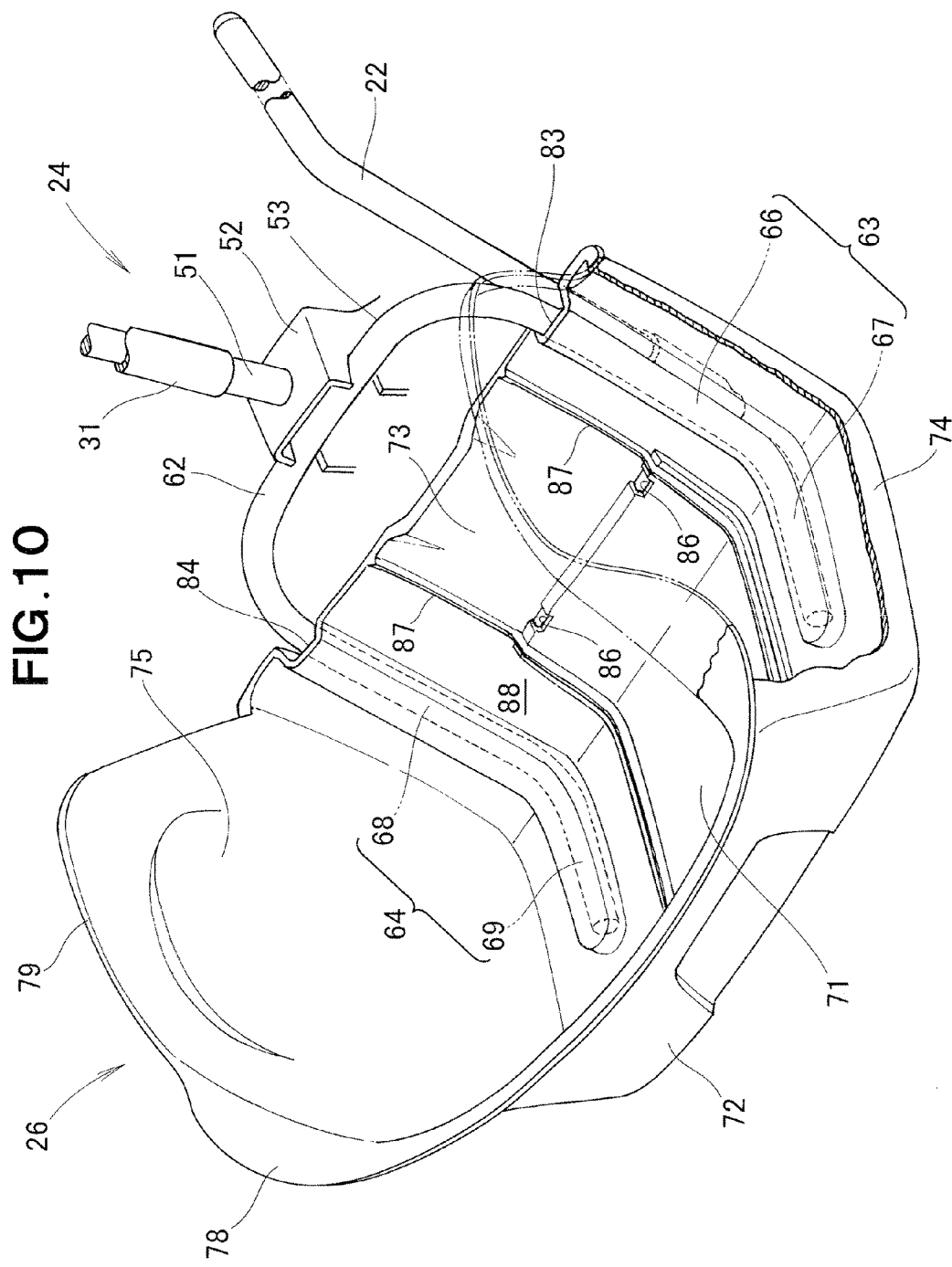
FIG. 10 is a perspective view, with parts broken away for clarity, of the carrier case and related parts of the stand unit.
Figure 11:
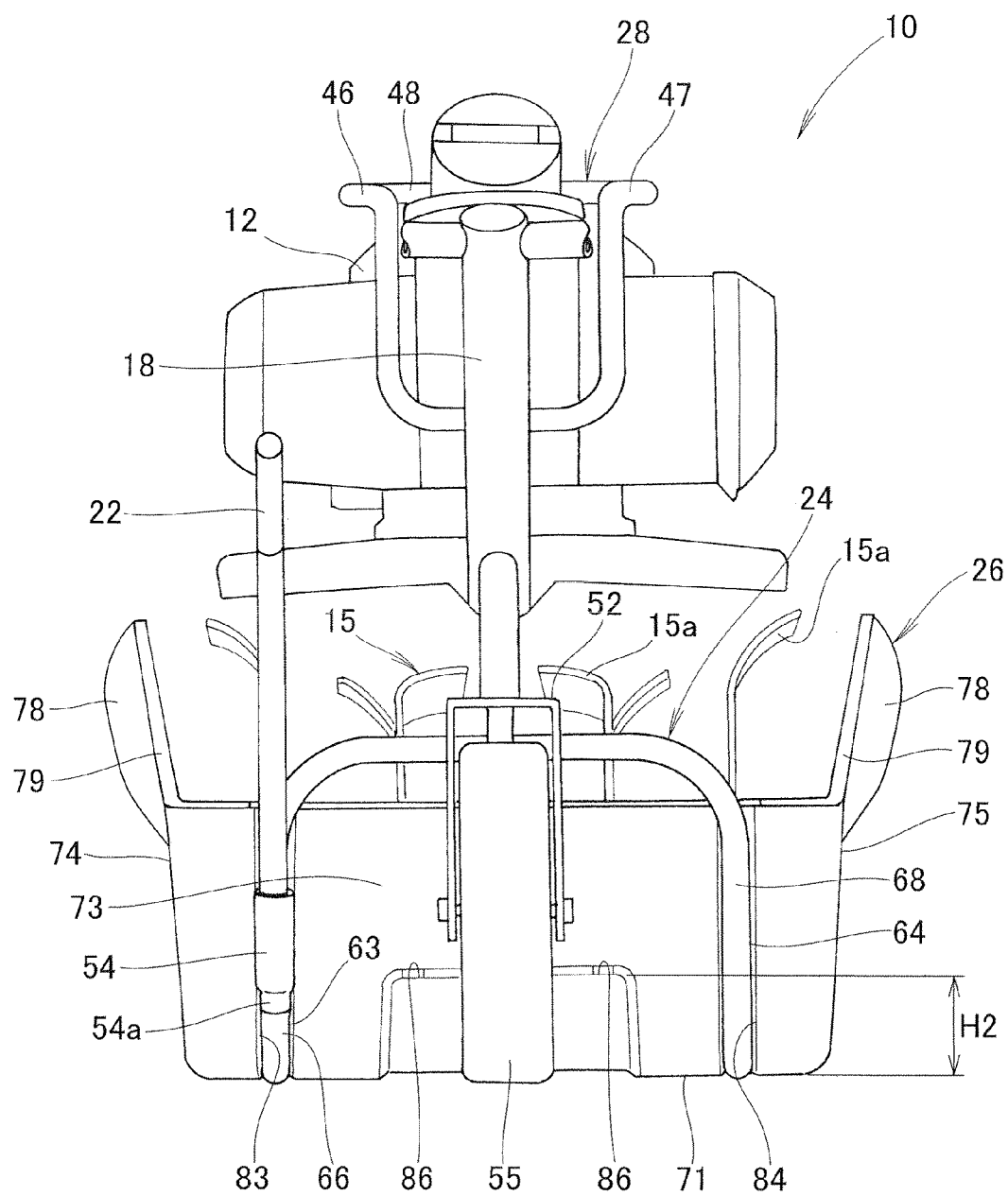
FIG. 11 is a rear view of FIG. 9.

FIG. 10 shows the carrier case 26 in perspective, with parts broken away for clarity, and FIG. 11 is a rear view of the tiller 10 having the carrier case 26 mounted on the stand unit 26. As shown in FIG. 10, the carrier case 26 has a pair of parallel spaced (left and right) recessed engagement grooves 83, 84 formed in an outer surface of the carrier case 26 at portions corresponding to the positions of the left and right support legs 63, 64 of the stand unit 24 for fitting engagement with the support legs 63, 64 to attach the carrier case 26 to the stand unit 24.

The left and right recessed engagement grooves 83, 84 are bent into an L-shape and extend from an upper edge of the rear wall 73 in a downward direction to the rear edge of the bottom wall 71 and continuously extend therefrom in a horizontal direction toward the front edge of the bottom wall 71 but terminating short of the front edge of the bottom wall 71. In the illustrated embodiment, the left and right recessed engagement grooves 83, 84 are disposed relatively close to the corresponding sidewalls 74, 75.

As described above with reference to FIG. 2, when the tiller 10 is held in the self-standing state by the stand unit 24, the tilling 15 is vertically and upwardly separated from the ground surface by the distance H1. The distance H is at least larger than a maximum thickness of the bottom and rear walls 71, 72 of the carrier case 26. By using the spacing between the tilling 15 and the ground surface, the carrier case 26 formed with the recessed engagement grooves 83, 84 of the foregoing configuration can be mounted on and removed from the stand unit 24 while the tiller 10 remains in the upstanding state. More particularly, the carrier case 26 is inserted between the tilling 15 and the support legs 63, 64 of the stand member 53 by merely forcing the carrier case 26 to advance along the support legs 63, 64 in a direction from the front ends (toes of the feet 67, 69) of the support legs 63, 64 toward the upper horizontal portion 62 of the stand member 53, with the upper edge of the rear wall 73 directed forward as a leading end of the carrier case 26, while the recessed engagement grooves 83, 84 are held in guided engagement with the support legs 63, 64. During advancing movement along the support legs 63, 64, the carrier case 26 turns counterclockwise about an axis of the tilling shaft 13 through an angle of about 90 degrees. The grip portions 78 of the carrier case 26 facilitate smooth and easy handling of the carrier case 26 by the user when the carrier case 26 is to be attached to or removed from the stand unit 24.

As shown in FIGS. 10 and 11, the carrier case 26 has a pair of drain holes 86 formed in the rear wall 73 for drawing off a liquid such as water from an internal space 88 of the carrier case 26. The drain holes 86 are located at a position which is vertically and upwardly spaced from a bottom surface of the carrier case 26 by a distance H2 (FIG. 11). The drain holes 86 are disposed adjacent to a pair of reinforcement ribs 87, 87, respectively, which are provided between the left and right recessed engagement grooves 83, 84. The reinforcement ribs 87 extend continuously from the upper edge of the rear wall 73 to the front edge of the bottom wall 71 across the read edge of the bottom wall 71. Since the drain holes 86 are located at a higher level than that of the bottom wall 71 of the carrier case 26, the carrier case 26 can retain within the internal space 88 thereof a predetermined amount of water that may drop from the tilling unit 15 after washing of the tilling unit 15. This is particularly advantageous when the tiller 10 is stored in a storage site or transported by a vehicle because the storage site or the vehicle is prevented from becoming flooded with water.

The drain holes 86 can readily assume a lowermost position of the carrier case 26 when the tiller 10 (FIG. 1) is tilted downward in the backward direction of the tiller 10 about an axis of the wheel 55. In this instance, water retained within the internal space 88 of the carrier case 26 is drawn off from the drain holes 86. The drain holes 86 may be formed in the front wall 72 of the carrier case 26 in which instance the tiller 10 is tilted downward in the forward direction of the tiller 10 about the front ends of the support legs 63, 64.

Referring back to FIG. 9, the carry handle 28 is connected to a substantially longitudinal central portion of the handle column 18 for gripping by a human operator when the tiller 10 is to be hand-carried. The carry handle 28 has a generally U-shaped configuration as viewed from above and includes a pair of laterally spaced left and right grip portions 46, 47 and a central grip portion 48 extending between front ends of the left and right grip portions 46, 47. The tiller 10 may be hand-carried by two human operators in which instance the left grip portion 46 is gripped by one human operator standing on a left side of the carrier case 26 of the tiller 10 and the right grip portion 47 is gripped by another human operator standing on a right side of the carrier case 26 of the tiller 10. Alternatively, the tiller 10 may be hand-carried by a single human operator in which instance the central grip portion 48 is gripped by the human operator standing on a left side or a right side of the carrier case 26 of the tiller 10. In either case, because of the recessed portions 81 provided behind the respective grip portions 78, 78 on the left and right sides of the carrier case 26, the carrier case 26 does not interfere with the human operator or operators who are attempting to lift up and hand-carry the tiller 10. It may occur that water retained in the carrier case is discharged from the drain holes 86 due to the backward tilting or inclination of the tiller 10 during hand-carrying by the human operator or operators. In this instance, however, since the drain holes 86 are provided in the rear wall 73 of the carrier case 26, the water discharged from the drain holes 86 does never splash over the human operator or operators standing on the lateral sides of the carrier case 26.

Referring next to FIGS. 12 through 16, description will be given to a sequence of operations to be achieved to attach the stand unit 24 to the attachment pipe 31 of the tiller 10 in place of the resistance bar 22.

Figure 12:
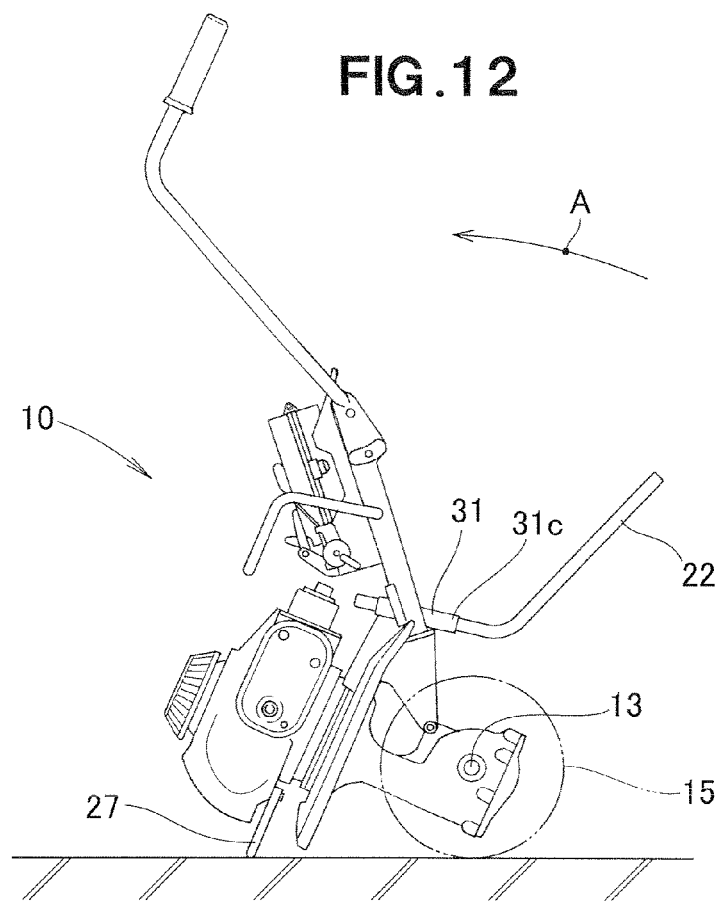
FIGS. 12 through 16 are diagrammatical views illustrative of the manner in which the resistance bar is removed from the body frame and the stand unit is attached to the body frame in place of the resistance bar.

As shown in FIG. 12, the tiller 10 is tilted downward in the forward direction (indicated by the arrow A) about the tilling shaft 13 until a front guard member 27 becomes contact with the ground surface. By thus tilting the tiller 10, a lower end 31c of the attachment pipe 31 is oriented toward the backward direction of the tiller 10 while the resistance bar 22 is held in an attachment/detachment position which is separated far distance from the ground surface.

Figure 13:
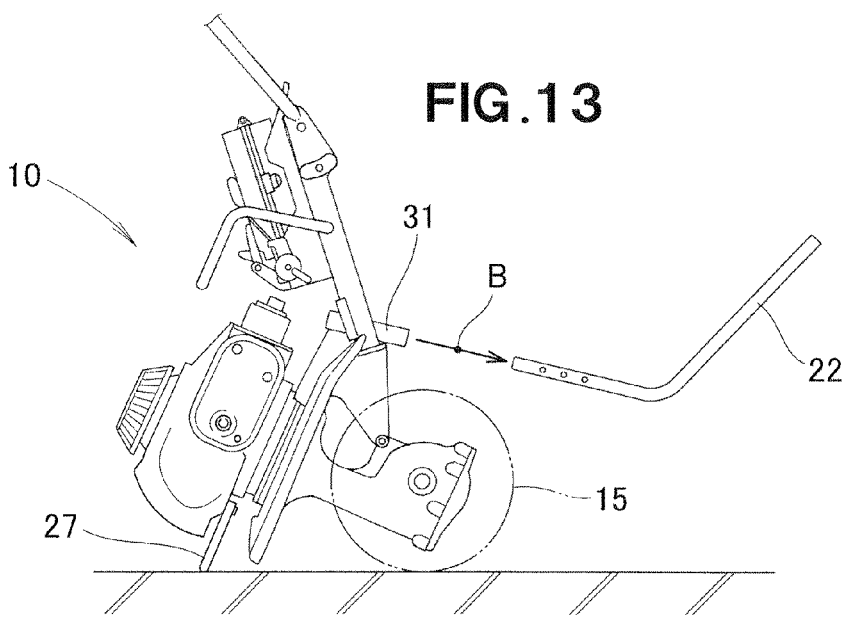

Then, the handgrip 42c (FIG. 5) of the adjuster pin 42 of the adjuster pin assembly 32 is pulled by the human operator until the attachment hole 22a of the resistance bar 22 is released from interlocking engagement with the adjuster pin 42, and the resistance bar 22 is removed from the resistance-bar attachment hole 33 (FIG. 5) of the attachment pipe 31 as indicated by the arrow B shown in FIG. 13.

Figure 14:
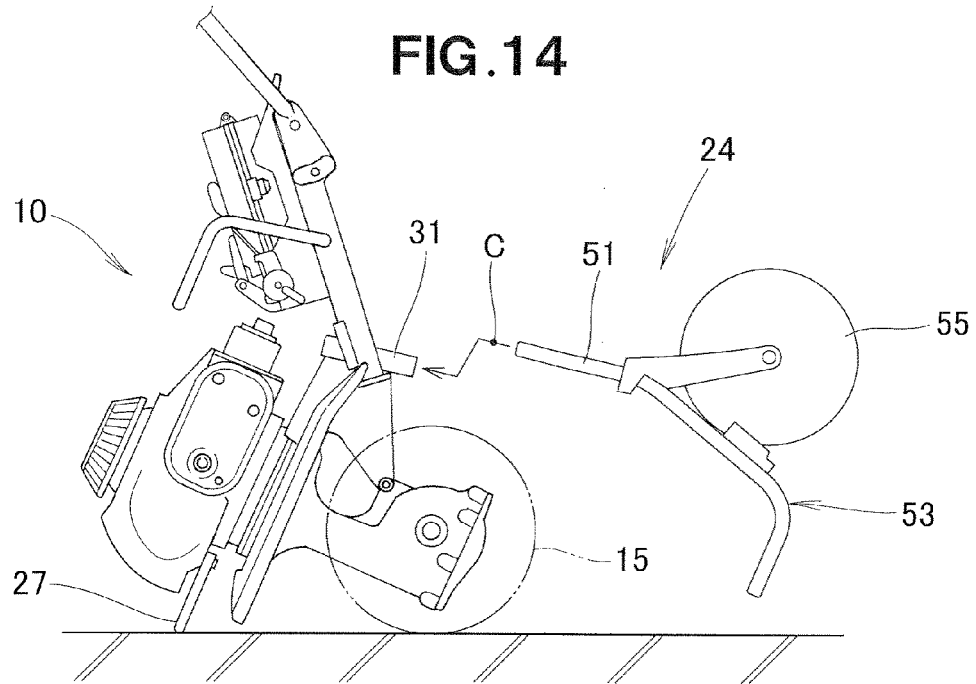

Subsequently, the pole portion 51 of the stand unit 24 is inserted in the resistance-bar attachment hole 33 (FIG. 5) of the attachment pipe 31 as indicated by the arrow C shown in FIG. 14. The adjuster pin 42 is pulled again to such an extent as to allow advancing movement of the pole portion 51 past the adjustment pin 42, and while the attachment hole 51c (FIG. 7) of the pole portion 51 is held in alignment with the front end portion 42d (FIG. 5) of the adjuster pin 42, the adjuster pin 42 is released, whereupon the adjuster pin 42 moves into locking engagement with the attachment hole 51c of the pole portion 51 by the force of the compression coil spring 43 (FIG. 5). The pole portion 51 of the stand unit 24 is thus attached to the attachment pipe 31 of the tiller 10.

Figure 15:
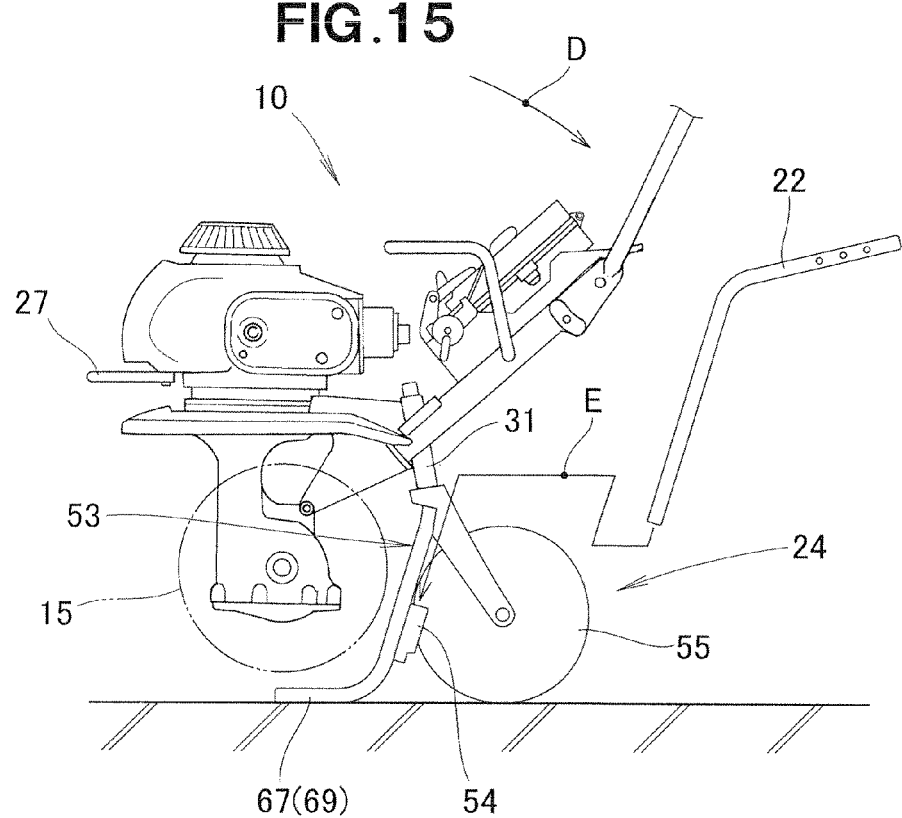

Then, the tiller 10 is tilted downward in the backward direction as indicated by the arrow D shown in FIG. 15 until the tiller 10 assumes an upright position. In this instance, the tiller 10 is held in a self-standing state by the stand unit 15 while the left and right horizontal feet 67, 69 and the wheel 55 of the stand unit 24 are in contact with the ground surface. Subsequently, the resistance bar 22 is set on the stand unit 24 by inserting a lower end portion of the resistance bar 22 into the tubular holder 54 as indicated by the arrow E shown in FIG. 15.

Figure 16:
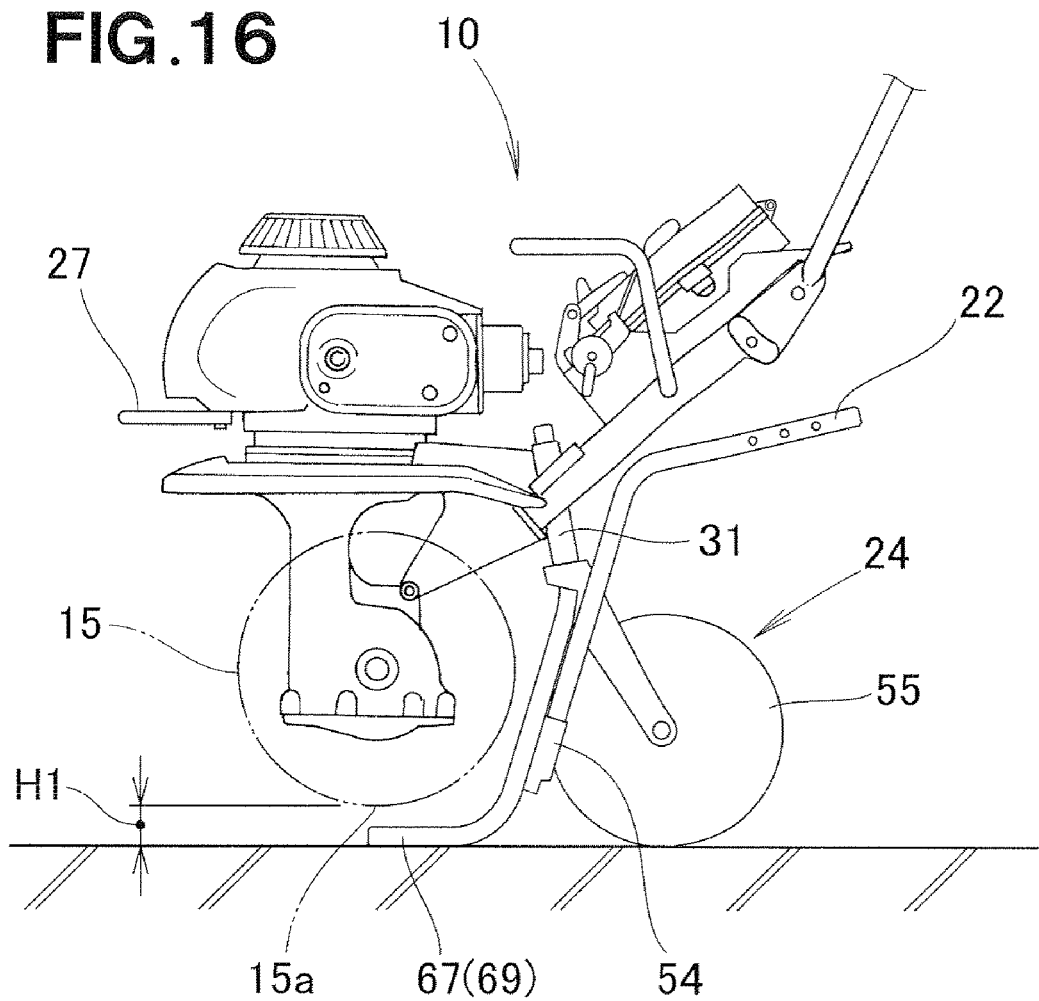

While the tiller 10 is held in the self-standing state by the stand unit 24, the left and right horizontal feet 67, 69 of the stand unit 24 are disposed directly below the tilling unit 15 with a space defined between the feet 67, 69 and the tilling unit 15. Accordingly, the lower end 15a of the tilling unit 15 is vertically and upwardly separated from the ground surface by the distance H1, as shown in FIG. 16, and the tilling 15 is now suspended in the air.

Figure 17:
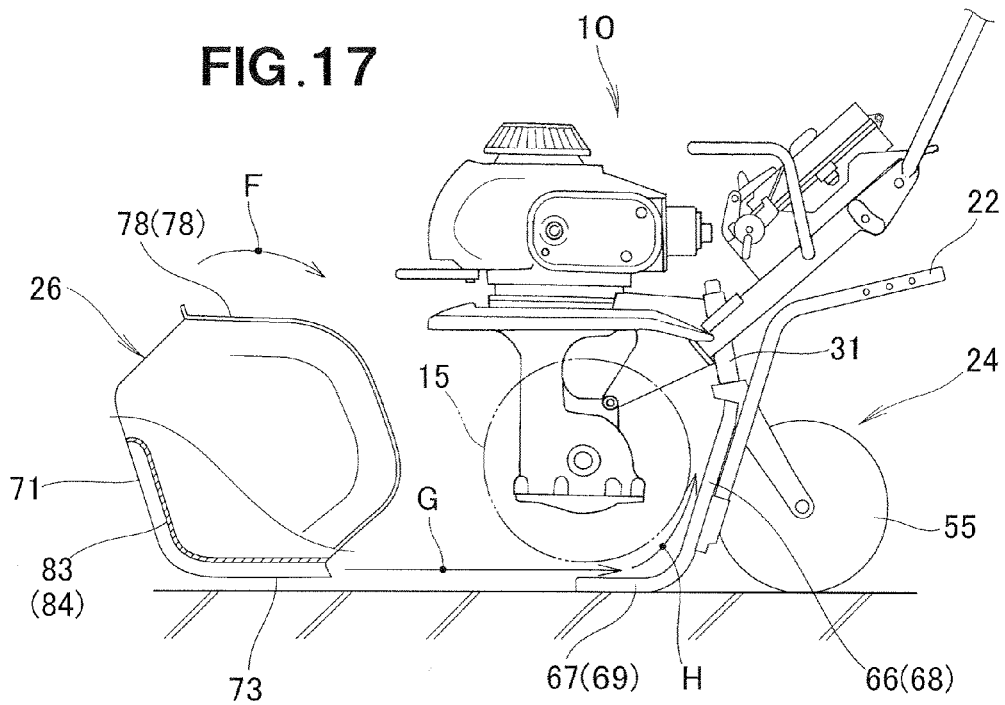
FIGS. 17 and 18 are diagrammatical views illustrative of the manner in which the carrier case is attached to the stand unit to thereby mount the carrier case to the body frame.
Figure 18:
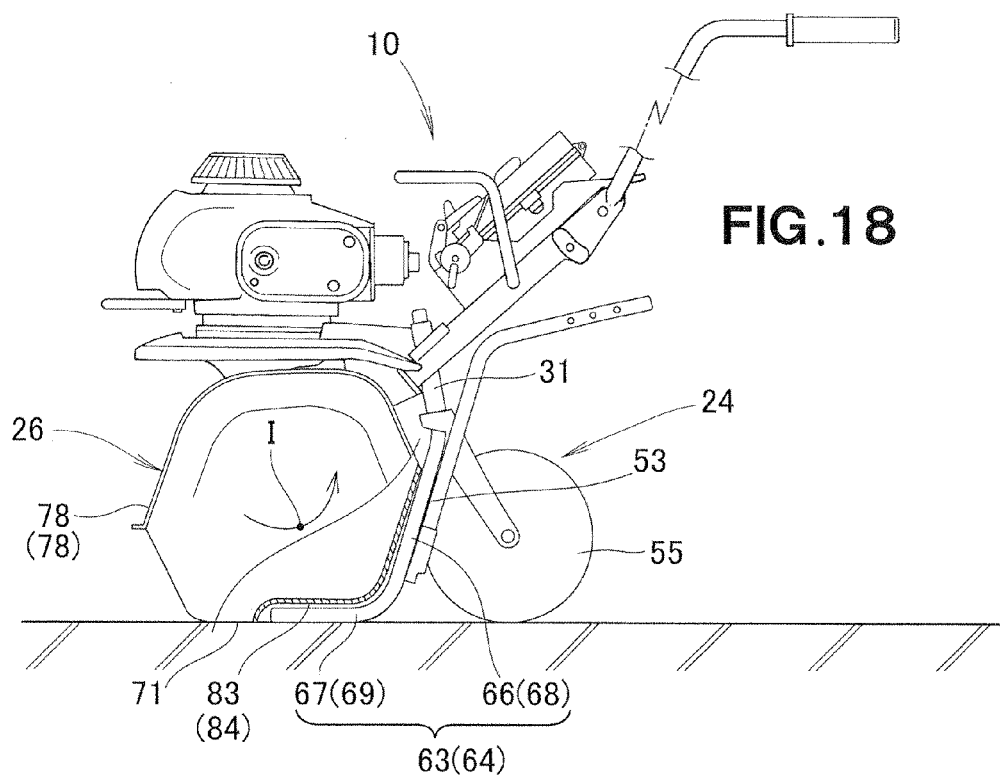

Referring next to FIGS. 17 and 18, description will be given to a sequence of operations to be achieved to attach the carrier case 26 to the stand unit 24.

As shown in FIG. 17, the carrier case 26 is first placed in front of the tilling unit 15 and then tilted downward in the backward direction of the tiller 10 until the rear wall 73 of the carrier case 26 lies flat on the ground surface. Subsequently, while the grip portions 78 of the carrier case 26 are gripped by the human operator, the carrier case 26 is advanced toward the tilling unit 15 as indicated by the arrow G with the upper edge of the rear wall 73 directed forward to form a leading end of the carrier case 26).

After an adjustment is made to bring the recessed engagement grooves 83, 84 into alignment with the support legs 63, 64 of the stand unit 24, the carrier case 26 is forced to advance along the support legs 63, 64 with the upper edge of the rear wall 73 directed forward as a leading end of the carrier case 26 while the recessed engagement grooves 83, 84 are held in guided engagement with the support legs 63, 63. As the leading end of the case 26 (i.e., the upper edge of the rear wall 73 advances in a direction from the front ends (toes of the feet 67, 69) of the support legs 63, 64 toward the upper horizontal portion 62 (FIG. 10) of the stand member 53 as indicated by the arrow H shown in FIG. 17, the carrier case 26 turns counterclockwise about the tilling shaft 13 (FIG. 2) through an angle of about 90 degrees as indicated by the arrow I shown in FIG. 18. The counterclockwise turning movement of the carrier case 26 is terminated when the bottom wall 71 is disposed horizontally and makes contact with the ground surface, as shown in FIG. 18.

The carrier case 26 is attached to the stand unit 24 in a condition in which the carrier case 26 is held on the support legs 63, 64 of the stand member 53 of the stand unit 24. It will be readily appreciated from the foregoing description that by using the spacing between the tilling unit 15 and the horizontal legs 67, 69 of the stand unit 24, the carrier case 26 can be readily mounted on the stand unit 24 by merely forcing the carrier case 26 to advance along the support legs 63, 64 in a direction from the front ends (toes of the feet 67, 69) of the support legs 63, 64 toward the upper horizontal portion 62 of the stand member 53, with the upper edge of the rear wall 73 directed forward as a leading end of the carrier case 26, while the recessed engagement grooves 83, 84 are held in guided engagement with the support legs 63, 64. During advancing movement of the leading end of the carrier case 26, the tiller 10 remains in the upright position.

Obviously, various minor changes and modifications of the present invention are possible in light of the above teaching. For example, the number of the support legs 63, 64 of the stand member 53 should by no means be limited to two as in the illustrated embodiment. The stand member 53 may have a single support leg having a generally T-shaped horizontal foot. Furthermore, the recessed engagement grooves 83, 84 may be formed to extend from the upper edge of the front wall 72 toward the rear edge of the bottom wall 71 and terminating short of the rear edge of the bottom wall 71. It is therefore to be understood that within the scope of the appended claims the present invention may be practiced otherwise than as specifically described.

What is claimed is:

1. A small-sized tiller comprising:
   a body frame having a resistance-bar attachment hole formed therein;
   a resistance bar removably mounted to the resistance-bar attachment hole for insertion into soil to stabilize the posture of the tiller during tilling operations;
   a stand unit configured to solely support the tiller in a self-standing state, said stand unit having a pole portion removably mountable to the resistance-bar attachment hole when the resistance bar has been removed from the resistance-bar attachment hole;
   a tilling unit rotatably mounted to a lower portion of the body frame for cultivating soil, and a carrier case removably attached to the stand unit for covering the tilling unit from below,
   wherein the stand unit has at least one support leg extending in a vertical downward direction of the body frame and terminating in a horizontal foot disposed below the tilling unit with a space defined between a lower end portion of the tilling unit and the horizontal foot of the stand unit, and the carrier case has a recessed engagement groove formed in an outer surface of the carrier case and fixedly engageable with the support leg of the stand unit to support the carrier case on the stand unit,
   wherein the carrier case has a generally rectangular bottom wall, a front wall extending upwardly from a front edge of the rectangular bottom wall, a rear wall extending upwardly from a rear edge of the rectangular bottom wall, a left sidewall extending upwardly from a left side edge of the rectangular bottom wall, and a right sidewall extending upwardly from a right side edge of the rectangular bottom wall,
   wherein the recessed engagement groove is formed in the bottom wall and at least one of the front and rear walls and extends continuously from an upper edge of said one wall toward the other of the front and rear walls, the recessed engagement groove terminating short of the other wall, and
   wherein the carrier case is attached to the stand unit by forcing the carrier case to advance along the support leg in a direction from a front end toward an upper end of the support leg, with the upper edge of said one wall directed forward as a leading end of the carrier case, while the recessed engagement groove is held in guided engagement with the support leg.

2. The small-sized tiller according to claim 1, wherein the stand unit includes a wheel for allowing the tiller to be transferred.

3. The small-sized tiller according to claim 2, wherein the wheel is disposed rearwards of the horizontal foot of the stand unit and serves also as a second foot when the tiller is kept in the self-standing state by the stand unit.

4. The small-sized tiller according to claim 1, wherein each of the left and right sidewalls has a grip portion of an enlarged width projecting from an upper edge of each sidewall in a lateral outward direction of the carrier case, wherein the body frame further has a carry handle for being gripped by a human operator standing on a side of one of the left and right sidewalls when the tiller is to be hand-carried by the human operator, and wherein the grip portion is provided on only an end portion of the upper edge of each sidewall so as not to interfere with the human operator during hand-carrying of the tiller by the human operator.

5. The small-sized tiller according to claim 1, wherein the carrier case has at least one drain hole formed in one of the front and rear walls for drawing off water from the carrier case, the drain hole being located at a higher level than that of the bottom wall by a predetermined distance.

6. The small-sized tiller according to claim 1, wherein the stand unit has a tubular holder for releasably holding therein the resistance bar.

* * * * *